United States Patent Office
3,488,292
Patented Jan. 6, 1970

3,488,292
ALKALINE-EARTH METAL PYROPHOSPHATE PHOSPHORS
William A. McAllister, Convent Station, N.J., assignor to Westinghouse Electric Corporation, Pittsburgh, Pa., a corporation of Pennsylvania
No Drawing. Filed Feb. 16, 1967, Ser. No. 616,485
Int. Cl. C09k 1/36
U.S. Cl. 252—301.4                                    2 Claims

ABSTRACT OF THE DISCLOSURE

Alkaline-earth metal pyrophosphate phosphor is activated by lithium plus any of terbium, europium, samarium, terbium plus europium or europium plus samarium, which phosphor efficiently converts ultraviolet radiation to visible radiation.

BACKGROUND OF THE INVENTION

This invention relates to phosphors, and more particularly to alkaline-earth metal pyrophosphate activated by rare-earth elements.

Phosphors that emit efficiently at a particular wavelength are useful with fluorescent lamps and other similar applications, such as color correction of arc-discharge devices.

The rare-earth elements are known phosphor activators which yield emission at a characteristic wavelength with a variety of matrices. Calcium and strontium pyrophosphate activated by dysprosium is taught by Jenkens et al., Patent No. 2,427,728 dated Sept. 23, 1947. It is stated by the patentees that this phosphor is not appreciably excited by ultraviolet radiation of 2537 angstroms and 3650 angstroms, which are the primary exciting wavelengths used for mercury discharge lamps.

The efficiency of most phosphors is known to be highly dependent on temperature. Fluorescent arc-discharge devices that operate at high-temperature require a phosphor that has a good temperature dependence characteristic and that emits efficiency under such operational conditions.

SUMMARY OF THE INVENTION

It is an object of this invention to produce a novel phosphor which efficiently converts ultraviolet radiation to visible radiation of a particular color.

It is another object of this invention to provide such an efficient phosphor wherein the emitted radiation is varied by preselecting the activator.

It is further object to provide such a phosphor which exhibits a good temperature dependence characteristic.

These and other apparent objects are achieved by providing a phosphor consisting essentially of alkaline-earth metal pyrophosphate activated by terbium plus lithium, europium plus lithium, samarium plus lithium, terbium plus europium plus lithium, or europium plus samarium plus lithium.

DESCRIPTION OF THE PREFERRED EMBODIMENTS

The above-mentioned phosphors can be produced in accordance with the following specific examples.

EXAMPLE I

One mole of any of $CaCO_3$, $SrCO_3$, $BaCO_3$, or mixtures thereof is mixed with one mole of $NH_4H_2PO_4$ to which is added 0.0125 mole of $Tb_4O_7$ and 0.025 mole of $Li_2CO_3$. The raw mix is fired in a slightly reducing nitrogen-hydrogen atmosphere at between 1000–1300° C. for at least one-half hour. The firing atmosphere preferably comprises about 0.5% hydrogen by volume. This phosphor is also prepared by firing the raw mix in an inert atmosphere such as nitrogen.

EXAMPLE II

One mole of any of $CaCO_3$, $SrCO_3$, $BaCO_3$, or mixtures thereof is mixed with one mole of $NH_4H_2PO_4$ to which is added 0.025 mole of $Eu_2O_3$ and 0.025 mole of $LI_2CO_3$. The raw mix is fired in air at between 1000–1300° C. for at least one-half hour. Although air firing is preferred any atmosphere comprising oxygen can be utilized.

EXAMPLE III

One mole of any of $CaCO_3$, $SrCO_3$, $BaCO_3$, or mixtures thereof is mixed with one mole of $NH_4H_2PO_4$ to which is added 0.00625 mole of $Tb_4O_7$ and 0.0125 mole of $Eu_2O_3$ and 0.025 mole of $Li_2CO_3$. The raw mix is fired in a nitrogen atmosphere at between 1000–1300° C. for at least one-half hour. This phosphor is also prepared by firing the raw mix in other inert atmospheres such as argon or xenon.

In Example II samarium oxide can be substituted in whole or in part for the europium oxide, maintaining the total gram-atoms of samarium or samarium plus europium the same as in this Example II.

The phosphors of the present invention are expressible by the formula $M_2P_2O_7$:Z, Li, wherein M is at least one alkaline-earth metal, and Z is any of the indicated rare-earth metals, or any of the aforestated mixtures of rare-earth metal plus lithium to phosphorus can vary from 0.01 to 0.4 although the preferred atom ratio of total rare-earth metal plus lithium to phosphorus is about 0.1. The atom ratio of total rare-earth metal to lithium can vary from 0.04 to 2, and an atom ratio of total rare-earth metal to lithium of about 1 is preferred.

An alternative method of preparation of the phosphor is to supply the alkaline-earth metal and phosphorus in the form of $CaHPO_4$, $SrHPO_4$, $BaHPO_4$ instead of using the carbonates and ammonium dihydrogen phosphate. One or more refirings slightly increase the output of the prepared phosphors.

Phosphor embodiments which include samarium as activator are fired in air or other atmosphere comprising oxygen. The embodiment activated by samarium plus lithium emits with a line emission, concentrated primarily in the orange region of the visible spectrum.

When the phosphor is activated by europium plus lithium and is fired in air or other atmosphere comprising oxygen, the europium is apparently present in the tervalent state and the emission is a line emission concentrated primarily in the orange-red region of the visible spectrum.

When the phosphor is activated by europium plus samaruim plus lithium, and the phosphor is prepared by firing the raw mix in air or other atmosphere comprising oxygen, the emission is a line emission comprising a mixture of samarium-activator lines and europium-activator lines, depending on the relative proportions of these activators.

When the phosphor is activated by terbium plus lithium and is fired in a slightly reducing or an inert atmosphere, the emission is a line emission concentrated primarily in the green region of the visible spectrum.

When the phosphor is activated by terbium plus europium plus lithium and is fired in an inert atmosphere, the emission comprises the orange-red line emission of tervalent europium having the green line emission of terbium superimposed thereon with the relative intensity of these line emissions dependent on the relative activator concentration.

Calcium pyrophosphate activated by europium and lithium and prepared as specified herein has a good temperature dependence characteristic. At 300° C. when excited by 365 Nm. radiation the phosphor still produces 75% of the luminous energy that it yields at room temperature. When activated by terbium and lithium and excited by 365 Nm. at 300° C. the prosphor produces 65% of the luminous energy that it yields at room temperature. Such a temperature dependence characteristic is a substantial improvement over the common oxygen-dominated phosphors. All of the present phosphors are also excited by 254 Nm.

I claim as my invention:

1. A phosphor composition which is excited to luminescence by ultraviolet radiations consisting essentially of $M_2P_2O_7$:Z, Li, wherein M is at least one alkaline-earth metal, and Z is terbium, europium, samarium, terbium plus europium, or europium plus samarium, the atom ratio of total rare-earth metal plus lithium to phosphorus is from 0.01 to 0.4, and the atom ratio of total rare-earth metal to lithium is from 0.04 to 2, when Z consists of terbium said phosphor is prepared by firing the raw mix in an inert or slightly reducing atmosphere, when Z con-consists of terbium plus europium said phosphor is prepared by firing the raw mix in an inert atmosphere, and when Z consists of europium, samarium, or europium plus samarium said phosphor is prepared by firing the raw mix in an atmosphere comprising oxygen.

2. The phosphor as specified in claim 1, wherein the atom ratio of total rare-earth metal plus lithium to phosphorus is about 0.1 and the atom ratio of total rare-earth metal to lithium is about 1.

References Cited

UNITED STATES PATENTS

| | | |
|---|---|---|
| 3,211,666 | 10/1965 | McAllister. |
| 3,243,723 | 3/1966 | VanUitert _____ 252—301.4 |
| 3,257,327 | 6/1966 | Nassau _____ 252—301.5 |

OTHER REFERENCES

Nazarova: Cathodo Luminescence of Europium Activated Strontium Phosphates—Bull. Acad. Science, U.S.S.R., vol. 25, 1961, pp. 322–324.

TOBIAS E. LEVOW, Primary Examiner

R. D. EDMONDS, Assistant Examiner